United States Patent [19]
Keelor et al.

[11] 4,167,388
[45] Sep. 11, 1979

[54] APPARATUS FOR FORMING HOLLOW MEMBERS

[75] Inventors: John R. Keelor, North Palm Beach; James L. Williams, Lake Park, both of Fla.

[73] Assignee: United Technologies Corporation, Hartford, Conn.

[21] Appl. No.: 901,920

[22] Filed: May 1, 1978

[51] Int. Cl.$^2$ .................. B29C 17/00; B29C 17/04; B29C 17/07

[52] U.S. Cl. ........................... 425/387.1; 425/392; 425/393; 425/403; 425/324.1

[58] Field of Search ............... 425/392, 395, 393, 394, 425/403, 324, 387.1

[56] References Cited

U.S. PATENT DOCUMENTS

| | | | |
|---|---|---|---|
| 3,182,355 | 5/1965 | Arnaudin | 425/392 X |
| 3,719,443 | 3/1973 | Hall | 425/392 X |
| 3,753,635 | 8/1973 | Barnett | 425/392 X |
| 3,859,408 | 1/1975 | Vors et al. | 425/392 X |
| 3,890,079 | 6/1975 | Slater | 425/393 X |
| 3,910,744 | 10/1975 | Rouden et al. | 425/393 X |
| 4,009,982 | 3/1977 | Maier | 425/392 X |

Primary Examiner—J. Howard Flint, Jr.
Attorney, Agent, or Firm—Jack N. McCarthy

[57] ABSTRACT

A method and apparatus for forming hollow members wherein a preformed tube is placed between an upper and lower die having the finished tube contour, while each end of the preformed tube has a cylindrical end which is held by the dies; each cylindrical end is flared outwardly by the tapered end of a nozzle which is inserted and forced into each end forming a seal therewith. An incompressible forming substance is injected into one inlet nozzle through said preformed tube and out the other outlet nozzle into a chamber, a bleed valve permits purging the air; the substance is contained within said preformed tube and a piston is inserted into said chamber to increase the pressure on said substance. This finally forms the preformed tube into the shape set by the dies. The nozzles are located on axially sliding block members which are moved inwardly by a cam member moved downwardly by a press; after the forming, said block members being moved outwardly and said cam member being moved upwardly by spring biasing forces, said upper die having a biased alignment mechanism for fitting the upper die against said lower die before direct pressure forces said dies together.

9 Claims, 6 Drawing Figures

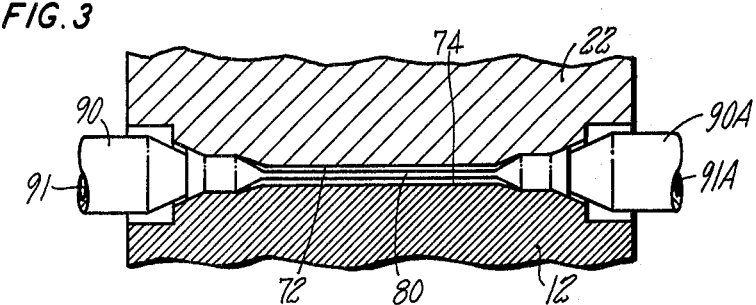
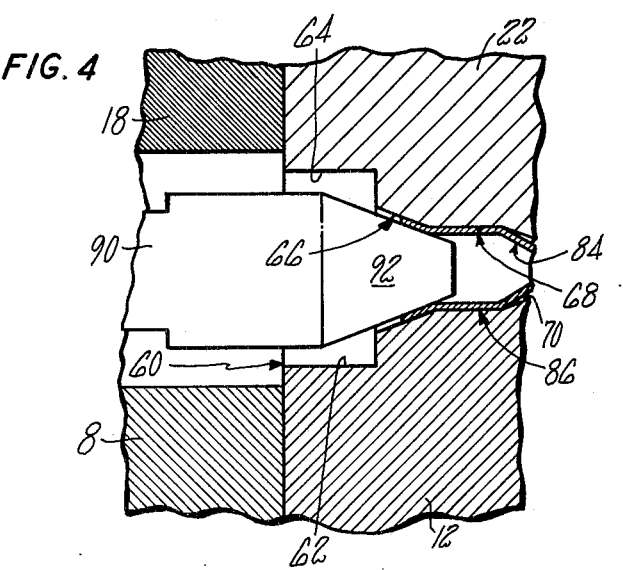
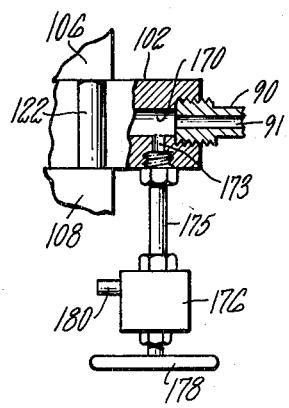

APPARATUS FOR FORMING HOLLOW MEMBERS

The invention herein described is made in the course of or under a contract or subcontract with the Department of the Air Force.

BACKGROUND OF THE INVENTION

This invention relates to an apparatus for improving the formation of hollow objects, such as hollow vanes having an airfoil contour. While hollow tubular members have been formed by dies previously, the specific apparatus and steps of applicants' method appear to be new.

SUMMARY OF THE INVENTION

It is an object of this invention to provide an apparatus for forming hollow members between dies wherein an incompressible forming substance is located in a preformed tube and the pressure on the forming substance is increased to press the preformed tube out into the dies to form the finally shaped hollow member.

It is another object of this invention to provide an apparatus having means for connecting the upper die to the upper press plate so that said upper die can be mated with said lower die to achieve proper positioning over the preformed tube before pressure is placed directly on the upper die. This arrangement comprises limited movement of the upper die with an intermediate biasing assembly which places a lesser force upon the upper die during its first contact with the lower die.

It is a further object of this invention to provide means for directing nozzles having tapered ends into cylindrical ends on a preformed tube mounted between dies so that the tapered ends of the nozzles flare the cylindrical ends outwardly to form a seal against a conical surface on the dies.

It is another object of the invention to provide an actuating mechanism for moving said nozzles axially which includes a sliding block member for each nozzle with said sliding block member being moved by a cam member actuated by a press to move the nozzles toward the dies.

It is a further object of this invention to provide a chamber in the sliding block member holding the outlet nozzle so that a piston can be inserted in said chamber and actuated by a device to move said piston within said chamber, said movement providing the pressure in said incompressible forming substance to force said preformed tube into contact with the forming surfaces on the dies.

It is another object of this invention to provide an apparatus to carry out a method whereby a preformed tube is placed in a die with a center section located between the final shaping surfaces of the die while each end of the preformed tube is formed as a cylinder and held tightly between the dies. A nozzle having a tapered surface is inserted into each cylindrical end of the preformed tube, flaring said end outwardly against a tapered surface on the dies to form a seal. An incompressible forming substance, such as grease, is inserted into one nozzle and out of the other nozzle, filling the preformed tube. While the substance is maintained in the tube, the pressure of the forming substance is then increased, pressing the preformed tube out into the dies to obtain the desired final shape.

It is another object of this invention to provide adjustable pressing bar means for moving each actuating mechanism which in turn moves the sliding block member, said adjustable pressing bar means coordinating the movement of said nozzles with the closing movement of said dies so that a positive simultaneous closing is made, with the nozzles sealing by tapering the cylindrical ends of the preformed tube against end conical surfaces of the closed die members.

BRIEF DESCRIPTION OF THE DRAWINGS

FIG. 3 is an enlarged view of the mating portions of the lower die and upper die with a preformed tube therein with the nozzles flaring out the ends thereof;

FIG. 4 is an enlarged view of the left end of FIG. 3 showing portions of the upper and lower die case, with the preformed tube shown in cross-section with the nozzle flaring out the outer end thereof;

FIG. 6 is a view taken through the chamber of a sliding block member showing the bleed valve for filling the necessary cavity with the incompressible forming substance.

DESCRIPTION OF THE PREFERRED EMBODIMENT

Figure 1:
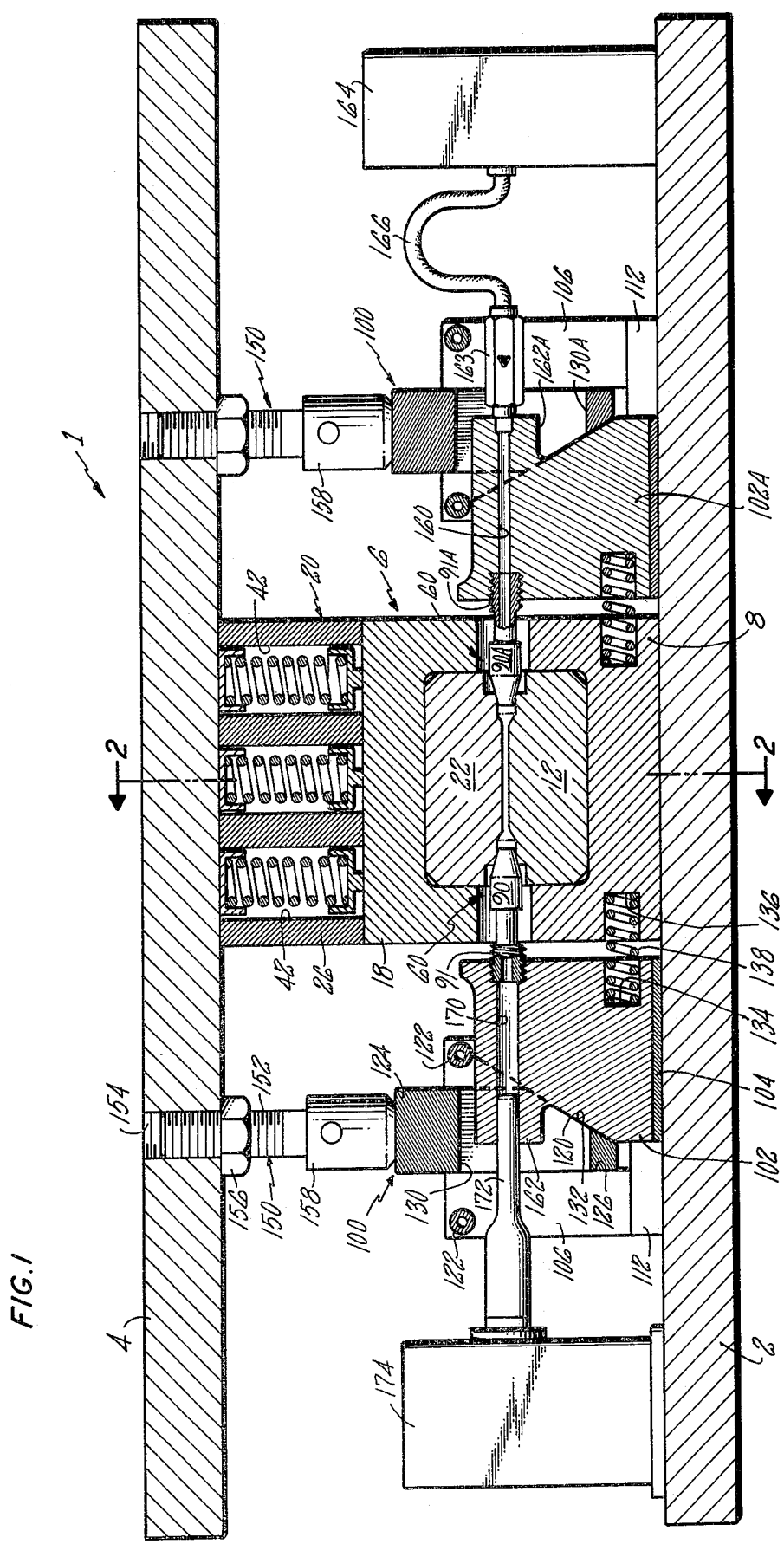
FIG. 1 is an elevational view in cross-section of the hollow member forming unit showing the die mechanism and nozzle actuating mechanisms; the container means and the actuating device for the pressure piston are shown in full.
Figure 2:
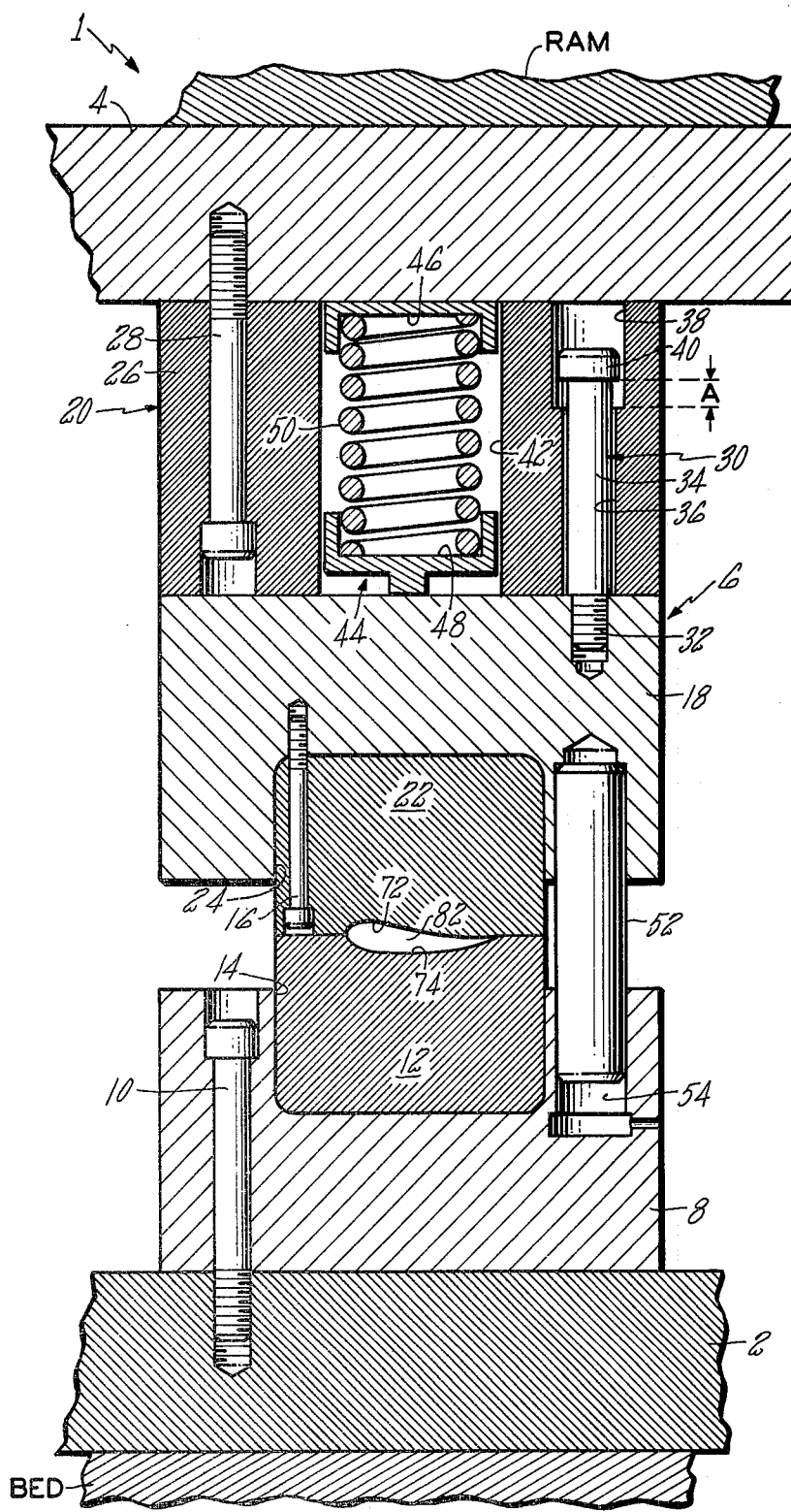
FIG. 2 is an enlarged sectional view taken along the line 2—2 of FIG. 1.

With reference to FIG. 1, a hollow member forming unit 1 is shown which is adapted to be positioned between a stationary bed and a movable ram of a conventional press. The press can be of the type shown in U.S. Pat. No. 3,698,219. A lower press plate 2 of the unit 1 is fixed to the bed of a press and an upper press plate 4 is fixed to the movable ram so that it can be moved up and down as desired. A die mechanism 6 comprises a lower die case 8 fixed to the lower press plate 2 by any means desired. In FIG. 2, bolts 10 are shown providing this function. A lower die 12 is fixed in a recess 14 in the lower die case 8. The lower die 12 is fixed in place in its recess 14 by a plurality of bolts 16 (not shown) and projects upwardly from the upper face of the lower die case 8.

The die mechanism 6 comprises an upper die case 18 connected to the upper press plate 4 by an intermediate biasing assembly 20. An upper die 22 is fixed in a recess 24 in the upper die case 18. The upper die 22 is fixed in place in its recess 24 by a plurality of bolts 16, and projects downwardly from the lower face of the upper die case 18.

The intermediate biasing assembly 20 comprises a member 26 for transmitting force from the upper press plate 4 to the upper die case 18 and upper die 22. The force transmitting member 26 is fixedly mounted to the upper press plate 4 by a plurality of bolts 28 and the upper die case 18 is fixed for limited vertical movement with respect to the member 26 of the intermediate biasing assembly 20. The means provided for permitting the vertical movement between the upper die case 18 and member 26 comprises a plurality of bolts 30, each having a lower end 32 threadably secured in the top of upper die case 18, while an intermediate shaft section 34 is slideably mounted in an elongated opening 36. The top of the opening 36 is countersunk to provide a larger opening 38. A head 40 is provided at the top of each bolt 30 and located in opening 38. The intermediate shaft section 34 is made of such a length so that a distance A is provided between the bottom of the head 40 and the shoulder provided where the openings 36 and 38 meet, when the bottom of the member 26 is engaging the top of the upper die case 18. It can be seen that this will permit a movement of the distance A between the upper die case 18 and bottom of the member 26.

The member 26 has three cylindrical openings 42 passing therethrough from the top to the bottom thereof and equally spaced along the length of the member 26 and along the lengthwise center line of the upper die case 18. Located within each cylindrical opening 42 is a biasing unit 44 for pressing downwardly on the top of the upper die case 18 for a purpose to be hereinafter described. However, it can be seen that as the ram of the press is moved upwardly away from the bed, pulling the intermediate biasing assembly 20 upwardly, the upper die case 18 will be biased downwardly below the bottom of the member 26 to the distance A and will remain in that position until the ram is lowered and the lower face of the upper die 22 engages the upper face of the lower die 12. Each biasing unit 44 is shown as upper spring retainer 46 and a lower spring retainer 48 with a heavy spring 50 therebetween. In a device built, a unit 44 used was a HYDRA-SPRING. An alignment pin 52 is fixed in a plurality of locations extending from the lower face of the upper die case 18 around the upper die 22, each to engage with a mating opening 54 in the lower die case 8 to aid in positioning the lower die 12 and upper die 22 as they are being brought together.

As mentioned hereinbefore, the lower die 12 and upper die 22 project out of their lower die case 8 and upper die case 18, respectively, a distance to admit access to cylindrical openings 60, one formed in each end of mating lower die 12 and upper die 22; the lower half of the cylindrical opening 60 is formed by a semi-circular groove 62 in the end of the lower die 12 extending from the upper surface thereof and the upper half of the cylindrical opening 60 is formed by a semi-circular groove 64 in the end of the upper die 22 extending from the lower surface thereof. While each end of the engaged lower die member 12 and upper die member 22 has the cylindrical opening 60 formed therein, the mating lower die 12 and upper die 22 then form a conical section 66, a smaller cylindrical section 68 and another conical section 70. Each conical section 70 is connected to one end of the tube forming cavity made up of forming surface 72 on the bottom surface of the upper die member 22 and the forming surface 74 on the upper surface of the lower die member 12.

A preformed tube is formed having a center hollow body 80 which will fit within the opening 82 between the forming surface 72 of the upper die member 22 and the forming surface 74 of the lower die member 12. Each end of the preformed tube has a conical section 84 which is placed within conical section 70 of closed lower and upper die members 12 and 22, respectively, and a cylindrical section 86 which fits within cylindrical section 68 of closed die members 12 and 22 and projects into the conical section 66 for a purpose to be hereinafter disclosed.

In operating this hollow member forming unit 1, a nozzle member 90 is brought toward each cylindrical opening 60 formed in each end of mating lower die 12 and upper die 22. Each nozzle 90 is sized to fit between the lower die case 8 and upper die case 18 and has a conical end 92 which is formed having the same angular surface as conical section 66. It can be seen from FIG. 4 that as each lower die 12 and upper die 22 meet over the preformed tube, the ends of the cylindrical sections 86 will be projecting into the conical portions 66 and at the same time the conical surfaces 92 of the nozzles 90 will be pressed inwardly from each end, entering the cylindrical sections 86 and flaring them outwardly against the conical surface 66 providing a seal at those locations.

The nozzle actuating mechanism 100 is the same for both nozzles; a sliding block member 102 is aligned with each cylindrical opening 60 while a nozzle 90 is fixedly attached thereto so it can be axially moved into and out of its cooperating cylindrical opening 60. It can be seen in FIG. 1 that each nozzle is threadably fixed into the end surface of its cooperating sliding block 102. For ease of movement, a sliding plate 104 is fixedly mounted to the lower press plate 2. To provide for accurate horizontal guiding of the block 102 and nozzle 90, side plates 106 and 108 are provided for engaging the sides of the blocks. The side members 106 and 108 are fixed to lower press plate 2 by bolts 110. To further guide the block 102, recesses 112 and 114 are provided along the bottom, while projections 116 and 118 project from the bottom of the block 102 along its sides to engage the grooves, respectively. The rear surface of the block 102 is formed as a cam surface 120. To properly space the tops of the side plates, spacers 122 are provided, which are fixed to each of the side plates 106.

Figure 5:
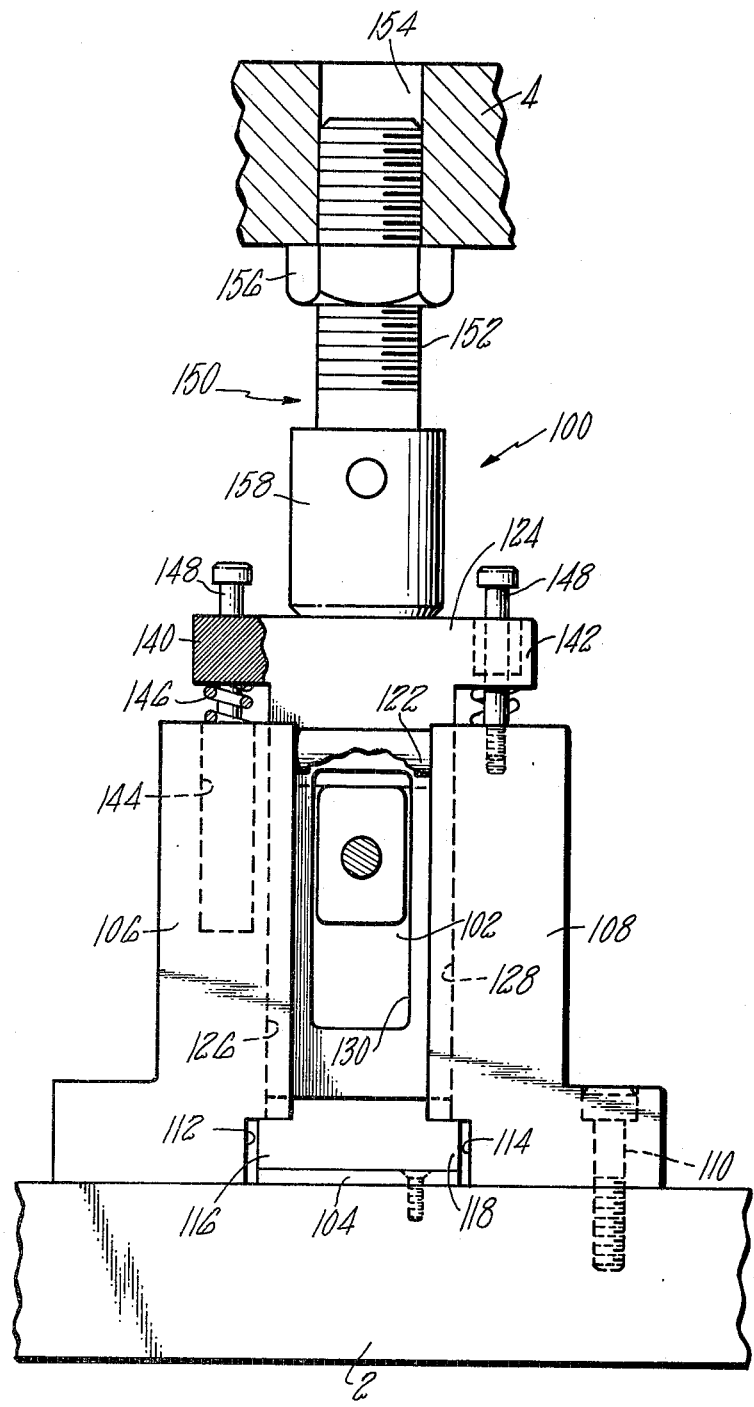
FIG. 5 is an enlarged view of the left end of FIG. 1 with the actuating device removed and the piston in section along with the upper press plate.

An actuating member 124 is mounted for vertical movement between said side plates 106 and 108 in vertical grooves 126 and 128. To obtain access to the rear of the cam surface 120, for a purpose to be hereinafter described, an opening 130 is provided through the lower part of the actuating member 124. The lower surface of the actuating member 124 facing the block 102 is formed as a cam surface 132 for engaging cam surface 120. It can be seen that as actuating member 124 is moved downwardly, cam surface 132 will act upon cam surface 120 to move the sliding block member 102 towards the die mechanism 6. When a force is removed from actuating member 124, biasing means are provided to move the block member 102 away from the die mechanism 6 and the actuating member 124 upwardly. Aligned recesses 134 and 136, in block member 102 and lower die case 8, have a spring 138 mounted therein to move the sliding block 102 away from lower die case 8. The top of actuating member 124 has flanges 140 and 142 extending over the tops of side plates 106 and 108, respectively. A bore 144 extends downwardly in each of side plates 106 and 108 and a spring 146 located in each of said bores 144 acts upon the bottom of flanges 140 and 142. The actuating member 124 is connected to the tops of the side plates 106 and 108 by four bolts 148 which permit movement of actuating member 124 within limits. The bolts 148 act in a similar manner to the bolts 30 shown in FIG. 2. Each nozzle actuating mechanism 100 has its actuating member 124 pressed downwardly by pressing bar means 150 which are fixedly mounted to the upper press plate 4. Each pressing bar means 150 comprises a threaded bar 152 which threadably engages an opening 154 in the upper press plate 4 and which is located immediately above the center of its cooperating actuating member 124 (see FIGS. 4 and 5). A lock nut 156 fixedly positions the threaded bar 152. The threaded bars 152 have a ram head 158 positioned thereon for actually contacting the actuating member 124.

It can be seen that the lock nut 156 can be loosened and the bar 152 rotated to change the amount projecting downwardly from said press plate 4 and when the desired length is obtained, the lock nut 156 can be replaced to fix the position of the threaded bar 152. The adjustability of the threaded bars 152 is necessary to have the hollow member forming unit 1 operate to have the die members 12 and 22 fully closed and have the nozzle members 90 in their proper inward position, flaring out the cylindrical sections 86 and providing the necessary seal, at the same time.

Each nozzle member 90 has a passage 91 therethrough for the passage of an incompressible forming substance such as grease. The nozzle 90A (at the right in FIG. 1) is the inlet nozzle and the nozzle 90 (on the left in FIG. 1) is the exit nozzle. The rear end of passage 91A is connected to a passage 160 in sliding block member 102A. Passage 160 extends to the other side of the block member 102A through an extension 162A which projects into opening 130A. A one-way check valve 163 is connected to the rear end of the passage 160 and only permits flow into said passage. A source of the incompressible forming substance is located in a container means 164 along with a device for placing the substance under pressure so that it will flow through said check valve 163. A flexible conduit 166 connects the output of the container means 164 to the one-way check valve 162.

The rear end of passage 91 is connected to a cylindrical chamber 170 in sliding block member 102. Chamber 170 extends to the other side of the block member 102 through an extension 162 which projects into opening 130. A piston member 172 extends into said chamber for approximately one-third of its length. The piston 172 is connected to an actuating device 174 which acts to move piston 172 axially within the chamber 170 as desired. Any known type of actuating means can be used.

As seen in FIG. 6, the chamber 170 has an opening 173 extending outwardly from the side thereof connected to a short conduit 175. A valve 176 is connected to the end of the conduit 175 having an actuating handle 178. Valve 176 includes an outlet at 180. Use of this mechanism will be hereinafter described.

OPERATION

When the hollow member forming unit 1 has been properly positioned in a conventional press, with the upper press plate 4 raised, the unit 1 is ready to be placed into operation. A preformed tube, such as shown in FIG. 3, is positioned over the forming surface 74 on the upper surface of the lower die member 12, with the cylindrical section 86 fitting within the portion of the cylindrical section 68 formed on the upper surface of the lower die member 12, with the cylindrical section 86 projecting into the portion of the conical section 66 formed in the upper surface of the lower die member 12. The upper press plate 4 is now ready to be moved downwardly with the upper die case 18 and upper die 22 located at the bottom of its range of movement (distance A) with the biasing units 44 maintaining it in that position.

As the upper press plate 4 continues to move downwardly, the alignment pins 52 of the upper die case 18 will engage their mating openings 54 in the lower die case 18 and as the plate moves further downwardly, the mating faces of the lower die 12 and upper die 22 will come together around the preformed tube, with the biasing units 44 permitting alignment of the upper die 22 with the preformed tube, to be sure that it is properly aligned before the distance A is taken up by further movement downwardly of the upper press plate 4.

After the upper die 22 has contacted the lower die 12, the ram heads 158 move downwardly and contact the actuating members 124 which moves the sliding block members 102 and 102A inwardly towards the die mechanism 6 with the nozzles 90 and 90A aligned and entering the cylindrical opening 60. As the die members 12 and 22 becomes engaged around the preformed tube, with the force thereon being applied directly through member 26, with the distance A having been taken up, the nozzles 90 and 90A have flared back the ends of the cylindrical sections 86 providing a seal at those locations.

The valve 176 is opened and the incompressible forming substance, grease was used for some forming operations, is placed under pressure so that it will flow through check valve 163, through passage 160 and passage 91A of nozzle 90A into the mating end of the preformed tube; the substance will then flow through the tube and into the opening 91 of nozzle 90 where it will fill chamber 170 and then (see FIG. 6) flow through opening 173 and conduit 175 through valve 176 and out the outlet 180. At this point, handle 178 is moved to close valve 176, locking the incompressible forming substance between valve 176 and one-way check valve 163. The actuating device 174 is then placed into operation, moving piston 172 axially into chamber 170 as desired. This movement of piston 172 forces the substance against the inner surface of the preformed tube, pressing it outwardly against the forming surfaces 72 and 74, providing the final tube shape.

After the final part is formed, the piston 172 is returned to its starting position. The upper press plate 4 is then raised, lifting the ram heads 150 and then the upper die 22. This leaves the springs 138 and 146 free to move the sliding block members 102 and 102A away from the die mechanism 6 and move the actuating members 124 upwardly.

We claim:

1. An apparatus for forming a hollow member from a preformed hollow member comprising die means for enclosing a preformed hollow member; said die means permitting each end of a preformed hollow member to protrude from said die means; first nozzle means for entering one open protruding end of a preformed hollow member to force it against a mating surface of the die thereby providing a seal; second nozzle means for entering another open protruding end of a preformed hollow member to force it against a mating surface of the die thereby providing a seal; each nozzle means being mounted on a slidable block providing for axial movement of the nozzle means for entry into an open protruding end of a preformed hollow member and for withdrawal therefrom; a source of forming substance; passage means connecting said source of forming substance to said first nozzle means through a one-way check valve; a chamber connected to the end of said second nozzle means; a piston located in said chamber; means for bleeding air from said chamber so that said forming substance can be placed in said passage means, said first nozzle means, a preformed hollow member, said second nozzle means and said chamber when said first and second nozzle means are providing a seal with ends of a preformed hollow member; means for moving said piston in said chamber to increase the pressure of said forming substance for forcing a preformed tubular member into said die means to give it its final form.

2. A combination as set forth in claim 1 including means for coordinating the movement of said die means to enclose a preformed hollow member with the entry of said nozzle means into the open protruding ends of a preformed hollow member so that as the die means become fully closed on a preformed hollow member the nozzle means have entered the ends of the preformed hollow member and sealed them.

3. An apparatus as set forth in claim 1 wherein said die means comprises a lower die and an upper die, a movable upper press plate, biasing means connecting said upper die to said upper press plate permitting the upper die to contact said lower die to obtain proper alignment before said upper die is moved directly by said upper press plate.

4. An apparatus as set forth in claim 1 wherein each slidable block has a first cam surface thereon, an actuating member being mounted for movement transverse to each slidable block each actuating member has a second cam surface thereon for mating with said first cam surface, means for moving each actuating member downwardly so that its second cam surface engages with said first cam surface to move said slidable block and associated nozzle means toward said die means.

5. An apparatus as set forth in claim 4 wherein said means for moving each actuating member downwardly includes bar means, a movable upper press plate, said bar means being connected to said upper press plate.

6. An apparatus as set forth in claim 1 wherein said die means comprises a lower die and an upper die, a movable upper press plate, biasing means connecting said upper die to said upper press plate permitting the upper die to contact said lower die to obtain proper alignment before said upper die is moved directly by said upper press plate, each slidable block has a first cam surface thereon, an actuating member being mounted for movement transverse to each slidable block, each actuating member has a second cam surface thereon for mating with said first cam surface, means for moving each actuating member downwardly so that its second cam surface engages with said first cam surface to move said slidable block and associated nozzle means toward said die means, said means for moving each actuating member downwardly including bar means, said bar means being connected to said upper press plate, means for coordinating the movement of said die means to enclose a preformed hollow member with the entry of said nozzle means into the open protruding ends of a preformed hollow member so that as the die means becomes fully closed on a preformed hollow member the nozzle means have entered the ends of the preformed hollow member and sealed them.

7. An apparatus as set forth in claim 5 including means for adjusting the length of each bar means.

8. An apparatus as set forth in claim 4 wherein spring means bias each slidable block and associated nozzle means away from said die means.

9. An apparatus as set forth in claim 6 wherein spring means bias each slidable block and associated nozzle means away from said dies means.

* * * * *